INVENTOR
JOSEF GEIMER
BY
KARL RATH
ATTORNEY

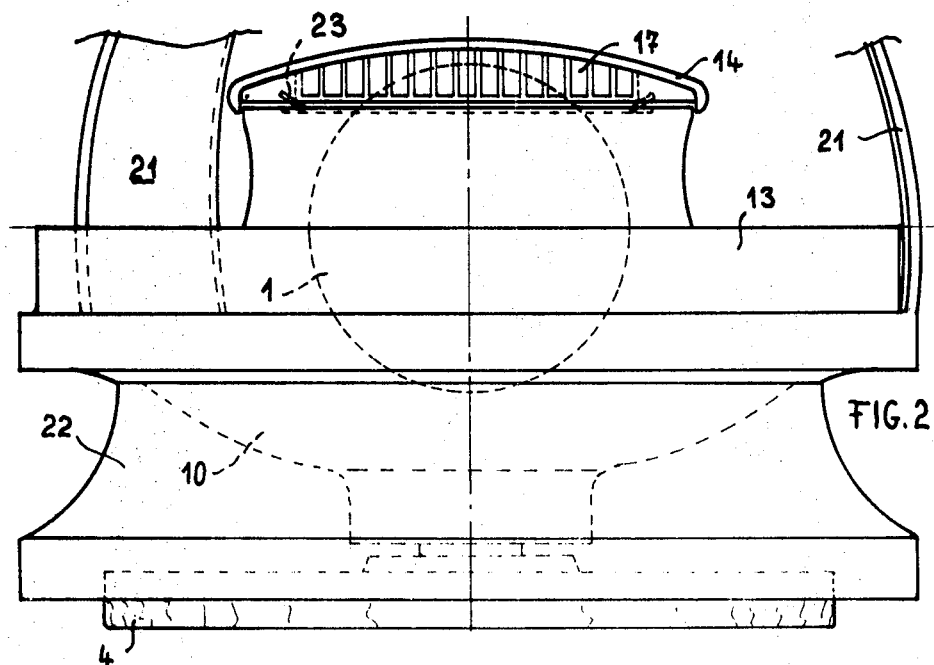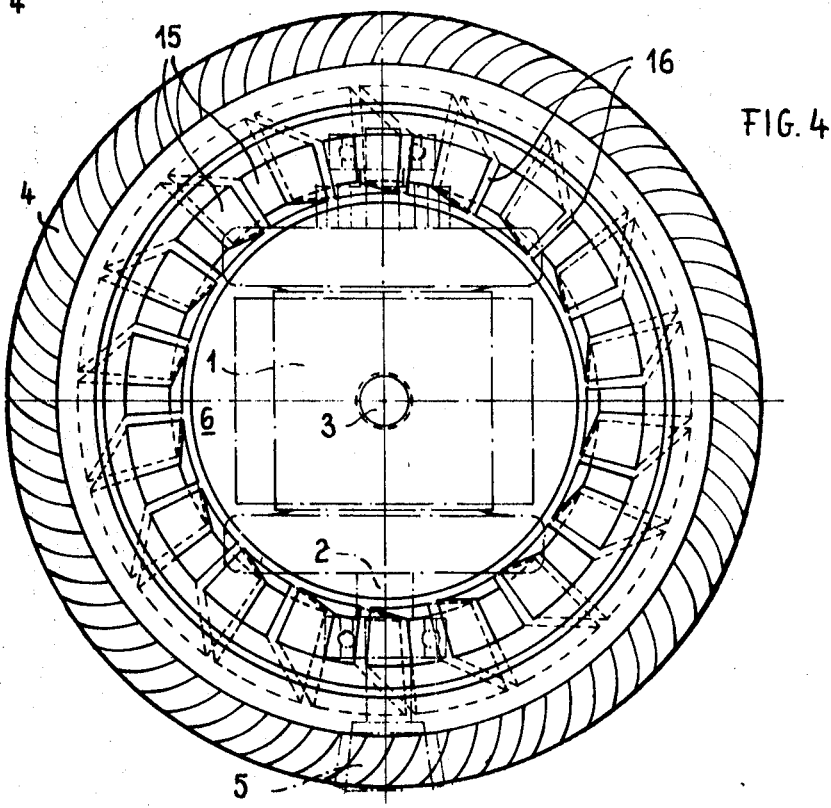

United States Patent Office 3,606,706
Patented Sept. 21, 1971

3,606,706
ELECTRICALLY-DRIVEN HAND TOOL WITH ROTATING TOOL MEMBER
Josef Geimer, Amalia van Solmsstraat 31, Drunen, Netherlands
Filed Feb. 6, 1969, Ser. No. 797,112
Claims priority, application Germany, Feb. 8, 1968, P 16 52 051.7; Dec. 28, 1968, P 18 17 333.6
Int. Cl. B24b 23/00
U.S. Cl. 51—170T
10 Claims

ABSTRACT OF THE DISCLOSURE

In an electrical hand tool having a rotating tool member (grinding, polishing, etc. wheel) and including a speed reduction gearing betwen the motor and tool shafts, the gearing consists of a dish-shaped carrier fitted at its outer end with bevel gear teeth meshing with a bevel pinion fast with the motor shaft. The carrier forms a shroud closely enveloping a part of the motor and having its inner and connected to the tool shaft journalled in the frame of the device. In a modified construction, the tool member is directly connected to the inner end of the carrier the outer toothed end of which forms the inner race of a ball bearing having an outer race connected to the frame.

---

The present invention relates to improvements in electrically-driven hand tools having a rotating tool member, more particularly though not limitatively to grinding, polishing, buffing and the like tools or devices.

There exists a great variety of tool constructions of this type all of which are more or less subject to the disadvantage of unwieldiness, or difficulty in handling during use or operation. Where the minimum power required for the operation of the tool is supplied by an electric motor, the latter normally assumes a rather large and unmanageable size or dimension, wherefor to make it necessary to provide a speed reduction gearing between the motor and tool member (grinding, polishing, etc. wheel), to enable the use of a high-speed motor of reduced size and increased efficiency.

In practice, the use of a reduction gearing has almost exclusively led to the well known angular tool design or construction, that is, with the motor driving the tool via an angular transmission or drive disposed outside and laterally of the tool axis. In the case of smaller size tools, the motor housing may serve as part of the operating handle, while in the case of relatively larger tools a special handle is usually found necessary forming an extension of the tool housing and advantageously serving as a support for the power supply cable of the motor. In most such constructions, a second handle is provided arranged at right angle to the shafts of both the motor and tool member.

It is obvious that tool constructions of the type heretofore known offer little or no possibility to exercise a close or "touch" control of the tool by the operator, primarily by reason of the fact that both the tool axis as well as the working parts or operative surface of the tool member are spaced at a relatively great distance from the handle and that, furthermore, the major portion of the weight, that is, the weight of the motor, is concentrated at a point outside of or at a distance from the tool axis. As a consequence, a balanced or "touch" control as desired especially in the carrying out of grinding or polishing operations is difficult to achieve in practice with conventional hand tools of the type designed or constructed according to the prior art.

Accordingly, an important object of the present invention is the provision of an improved electric hand tool having a rotating tool member of the referred to type, which, while being driven by a high-speed electric motor via a reduction gearing interposed between the motor and tool shafts, is substantially devoid of the afore-mentioned and related structural disadvantages and operating difficulties; which is constructed in such a manner that the tool member, arranged with its axis coinciding with a symmetry plane of the motor and drive mechanism at a right angle to the motor axis, is disposed at a minimum distance from the operating handle, to allow close or "touch" control of the operation; and which tool is both compact in construction and of greatly reduced weight and bulk, compared with the conventional tools or devices of this type known according to the prior art.

The invention, both as to the foregoing and ancillary objects as well as novel aspects thereof, will be better understood from the following detailed description, taken in conjunction with the accompanying drawings forming part of this disclosure and wherein;

FIG. 2 is a side view of the tool according to FIG. 1, as viewed in the direction of the motor axis;

FIG. 4 is a fragmentary plan view of the bevel gear carrier and tool member according to FIG. 1;

Like reference numerals denote like parts in the different views of the drawings.

Figure 1:
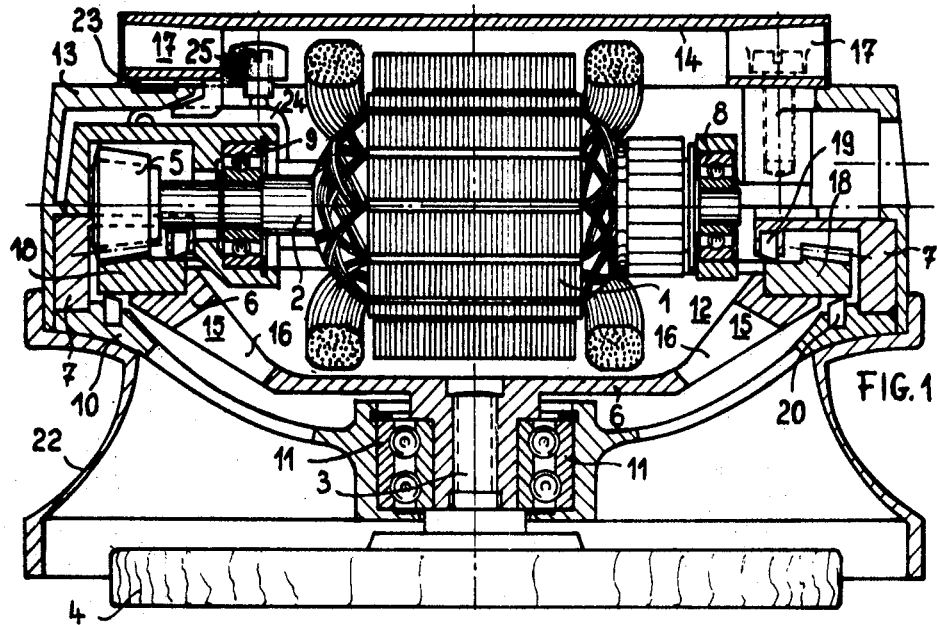
FIG. 1 is a vertical cross-section, taken along the motor axis, of a first embodiment of a hand tool constructed in accordance with the principles of the invention.

With the foregoing objects in view, the invention involves generally the provision of an electrical hand tool of the referred to type, wherein the drive motor is arranged with its axis at a right angle to the tool axis, wherein the center of gravity of the tool substantially coincides with a point of the tool axis and, furthermore, wherein the operating handle or point of attack by the hand of the operator also substantially coincides with the center of gravity of the motor or tool. In the preferred embodiment of the invention, the motor housing forming part of the tool housing is at least in part constructed in the form of a hand grip or operating handle.

According to a first embodiment of the invention, the speed reduction gearing interposed between the motor and the rotating tool member takes the form of a ring-shaped bevel gear meshing with a driving bevel pinion fast upon the motor shaft and having a conical or dish-shaped extension or gear carrier connected to the tool shaft which is journalled in the frame of the tool. The dish-shaped carrier formed with driven gear teeth at its outer periphery forms a shroud or envelope closely enveloping a part of the motor, in such a manner as to result in an overall extremely compact tool structure, on the one hand, and in a minimum distance between the tool member proper and the handle, preferably directly disposed upon the tool housing, on the other hand. Advantageously, the dish-shaped extension or gear carrier may be constructed in the form of a ventilator by the provision in its intermediate conical portion of a set of cooling fans or vanes, in a manner as will become more apparent as the description proceeds in reference to the drawings.

Moreover, the tool may be fitted, upon the outside of the motor housing with a preferably adjustable and displaceable hand strap, to enable use of the tool by both right-handed and left-handed persons.

According to another embodiment of the invention, to further reduce the constructional height or dimension of the tool, or to minimize the distance between the operating handle and the tool member proper, as well as to improve the dynamic balance or operating conditions of the rotating parts and to ensure a more quiet operation, a separate tool shaft and its bearing is dispensed with by the provision, upon the outer periphery of the dish-shaped bevel gear carrier, of the inner race of a ball bearing having a cooperating outer race supported by the frame of the tool. In this case, the rotating tool member (grinding, polishing, etc. wheel) is directly connected to or mounted upon the inner end of the bevel gear carrier, providing thereby an extremely compact and statically as well as dynamically well balanced structure. Besides, a construction of this type ensures both quiet running of the tool and operation substantially free from oscillations or vibrations. In other words, in a construction of this type, that is, with the driven gear ring forming the inner race of a ball bearing, the tool member is no longer journalled at a point adjoining or close to the tool axis, or near the inner end of the dish-shaped bevel gear as in the first-mentioned embodiment, but rather at a point remote from said axis, or near the outer end of said carrier.

Where the provision of cooling fans in the dish-shaped bevel gear carrier results in an undesired increase of the constructional height or dimension of the tool, a separate cooling fan may b provided directly mounted upon the motor shaft for cooperation with suitable vent holes provided in the motor housing.

Referring more particularly to FIGS. 1–4, the tool shown comprises an electric driving motor 1 having a shaft 2 which is journalled in the frame or housing enclosing the tool with its axis including a right angle with the axis of the tool shaft 3 which carries the rotating tool member shown in the form of a grinding, polishing or the like wheel 4. The axis of the tool shaft 3 coincides with the symmetry plane of the motor, at a right angle to the motor axis, in such a manner that the center of gravity of the motor and practically of the entire tool is located upon the extension of the axis of shaft 3 of the tool member 4.

The motor 1 drives, via a bevel pinion 5 fast on the motor shaft 2, a cooperating ring bevel gear comprised of a dome or dish-shaped carrier 6 fitted with peripheral bevel gear teeth 18 in the manner shown. The motor is rotatively supported by a base plate or support 7, forming part of the frame or housing of the tool, by means of ball bearings 8 and 9, support 7 being extended downwardly, to provide a vaulted extension 10 terminating in a ball bearing 11 rotatively supporting the tool shaft 3.

The motor 1 protrudes to practically its full lower part or half through an opening in the plate 7 and into the inner space or cavity 12 provided by the dish-shaped gear carrier 6, the latter thus forming a shroud closely enveloping the lower part of the motor. The upper part of the motor is enclosed by the cylindrical housing part 13 closed by a preferably removable top or cover 14.

A further extension of the housing in the form of a cowling 22 serves to protect the tool member 4. The housing parts 13, 14 and 22 substantially enveloping the tool therewith the tool member 4 projecting outwardly through an aperture in the enclosure may be constructed of a suitable high-impact plastic, to reduce weight and cost of the tool, while the parts 7 and 10 supporting the motor 1 and tool member 4 preferably consist of metal or metal alloy.

There is thus provided by the invention an extremely compact construction rendering the tool susceptible of single or one-hand operation and by a close or "touch" control of the operation. The dish-shaped carrier 6 has its intermediate conical wall portion advantageously provided with air passages or apertures 15 wherein are mounted inclined ventilating fins or vanes 16, FIG. 4, to provide for effective cooling of the motor during operation.

The space wherein rotates the ring gear 18 in meshing engagement with the pinion 5, is advantageously sealed from the remaining inner space of the tool by means of ring-shaped gaskets 19 and 20, to enable effective lubrication of the gears and without affecting the remaining parts of the tool.

The upper housing part 13 or cover 14 is advantageously constructed in the form of or structurally combined with the operating handle of the tool as shown by FIG. 2, to enable an easy and firm grip of and close manipulation of the tool during use. Besides, there may be provided an adjustable hand strap 21, to facilitate holding of the tool, said strap being shown in two alternative positions by full and dotted lines, respectively, in FIG. 3. The full line position serves for use of the tool by right-handed persons, while the dotted line position applies left-handed operation. The ends of the strap 21 may be secured to the upper edge of the cover portion or cowling 22 enclosing the lower part of the tool.

According to an improved feature of the invention, the cover 14 is unilaterally resiliently mounted by suitable springs indicated at 23, in such a manner as to allow of slight depression during the use of the tool. Disposed below the cover and supported by the housing is a microswitch 24 fitted wih a set screw or actuator 25 and serving to effect connection and disconnection of the motor or tool. As a consequence, operation of the tool may be started and interrupted by single-hand control simply by the application and release of slight digital pressure upon the cover 14, whereby to simplify and improve the operation and control of the tool.

In the effort to further improve the control, an upper limit of the tool pressure be indicated by a signal lamp 26 being lit whenever the safe or permissible pressure is exceeded during operation. The control of the lamp may be effected in various manners well known, such as by the aid of a spring-loaded contact, a centrifugal contact, bimetallic contact, or the like.

Referring to the modified tool construction according to FIGS. 5 and 6, the motor 1 again drives via the driving pinion 5, a bevel ring gear 31 secured, by means for screws or the like, to the periphery of a dish-shaped gear carrier 33 to the inner end of which is directly connected the tool member 4.

The ring bevel gear 31 constitutes or has secured to it the inner race of a ball bearing having na outer race 34 supported by the frame 13, both said races including a set of balls 35. Frame 13 may include additional parts or extensions 36 and 37 for supporting the bearings of the motor, in the manner shown and understood.

Figure 3:
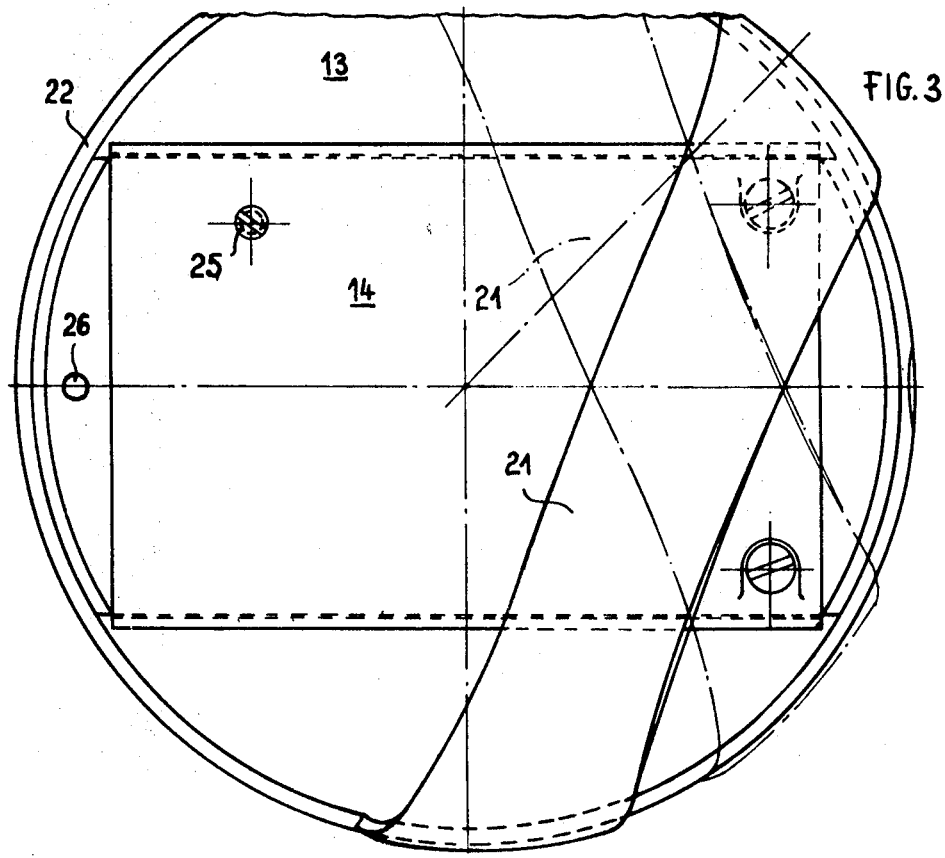
FIG. 3 is a plan view of the tool shown by FIG. 1.
Figure 5:
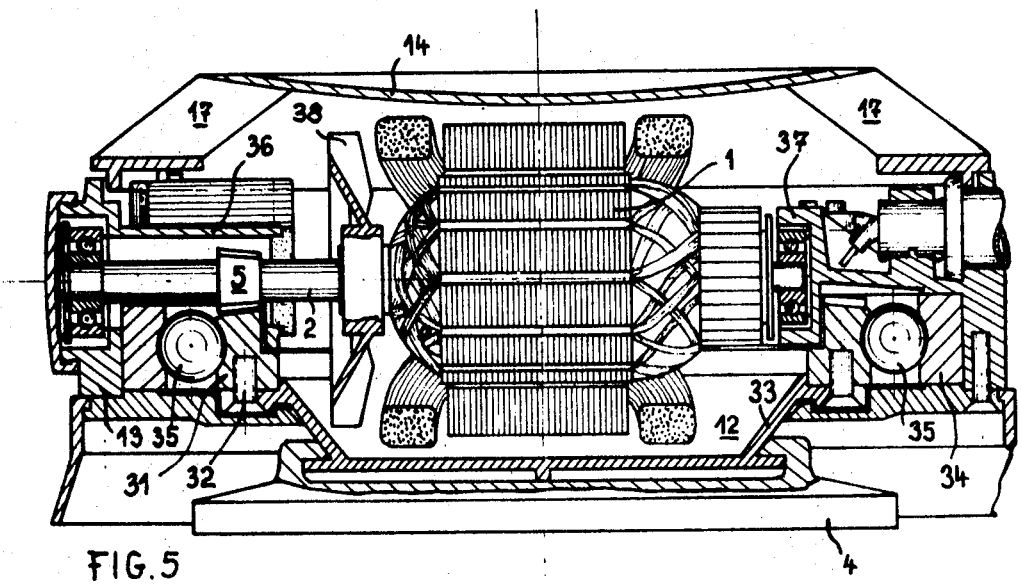
FIG. 5 is a view similar to FIG. 1 and showing a modified tool construction according to the invention.
Figure 6:
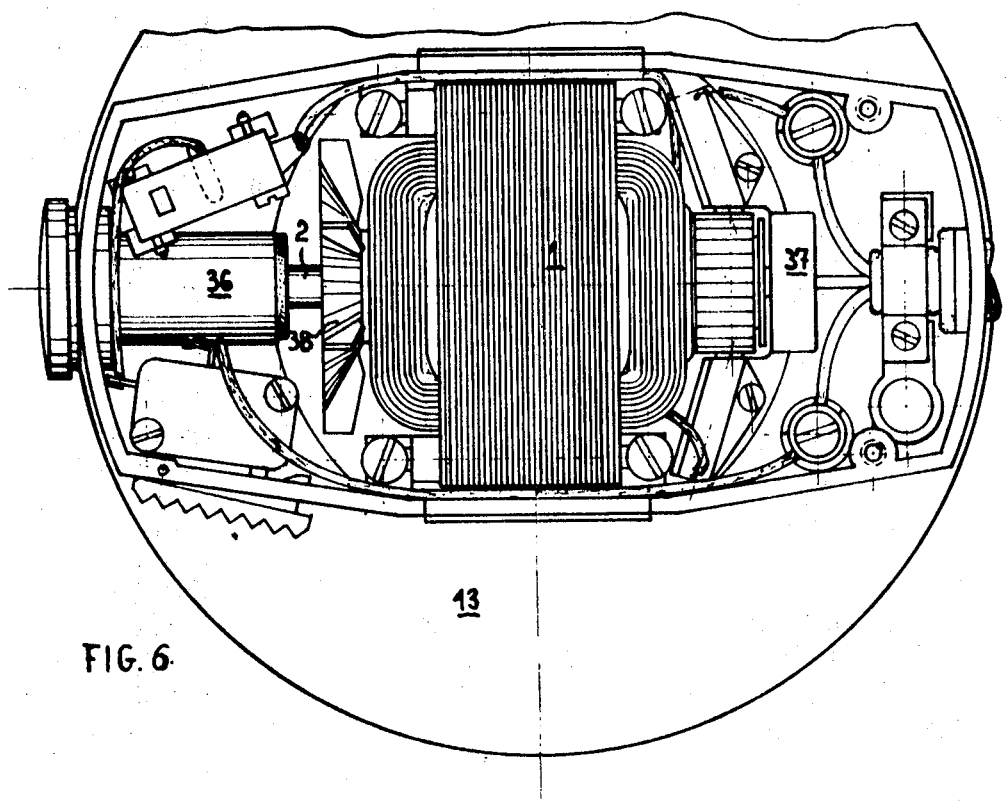
FIG. 6 is a plan view of the tool according to FIG. 5.

Again, the motor 1 in FIGS. 5 and 6 protrudes with its lower part into the space 12 enclosed by the gear carrier 33 and the tool is completely enclosed by the cover 14 applied to the upper part or wall 17 forming part of the housing. The cover 14 may be constructed in the form of or structurally combined with a handle, in the manner as shown in FIGS. 2 and 3, and openings or ventholes may be provided in the housing part 17 for cooperation with a separate cooling fan 38 mounted upon the motor shaft 2.

As can be seen from FIG. 5, the height of the tool is considerably reduced by a construction of this type, resulting thereby in a substantial reduction of the spacing between the center of gravity of the tool and the operating point or working surface upon the tool member 4. This, in turn, eliminates or minimizes the possibility of canting of the tool during operation and further increases the effectiveness and reliability of a "touch" control of the tool. Besides, the position of the support or bearing of the tool member at the periphery rather than at the center of the dish-shaped carrier 31, or remote from the tool axis, has the effect of an increased dynamic balance of the rotating parts, as well as of a more smooth and quiet running, substantially free from oscillations or vibrations.

In brief, there is provided by the invention a tool construction comprising a common and substantially closed frame or housing supporting both the motor and tool shafts as well as the reduction bevel gearing interposed therebetween, said gearing including a dish-shaped carrier closely enveloping a part of the motor and the tool member proper carried by the tool shaft projecting outwardly through an opening of said housing. Such an arrangement, aside from the advantage of extreme compactness of the tool, enables the provision of the operating handle at or near the center of gravity of the tool and, in turn, the achievement of a dynamic balance of the rotating parts coupled with an accurate and reliable "touch" control of the tool.

In the foregoing, the invention has been described in reference to specific exemplary devices or embodiments. It will be evident, however, that variations and modifications as well as the substitution of equivalent parts or elements shown herein for illustration, may be made without departing from the broader scope and spirit of the invention. The specification and drawing are accordingly to be regarded in an illustrative rather than a limiting sense.

I claim:
1. An electrical hand tool comprising in combination:
   (1) a housing
   (2) a pair of bearings mounted within and adjacent opposite sides of said housing,
   (3) an electric motor having a shaft extending therethrough, said shaft being journalled in said pair of bearings adjacent the ends thereof,
   (4) a driving bevel pinion secured to said shaft,
   (5) a cooperating driven bevel gear consisting of a dish-shaped carrier closely enveloping a part of said motor and fitted with peripheral driven gear teeth in meshing engagement with said pinion,
   (6) a tool-holding shaft secured to the central portion of said carrier, and
   (7) means connected to said housing to rotatively support said shaft and carrier about an axis coinciding with a symmetry plane of said motor including a right angle with the motor axis.

2. An electrical hand tool as claimed in claim 1, wherein said last named means connected to said housing includes a bearing surface rotatably supporting the tool-holding shaft.

3. An electrical hand tool as claimed in claim 1, wherein said last named means connected to said housing includes a ball bearing having a first race connected to said tool holding shaft, and a second race formed on said means.

4. An electrical hand tool as claimed in claim 1, wherein said dish-shaped carrier includes a bearing surface on the periphery thereof adjoining said gear teeth, and said means connected to said housing includes a corresponding bearing surface adjacent to the periphery of said carrier.

5. An electrical hand tool as claimed in claim 1, wherein the rotatable support between the dish-shaped carrier and said means connected to said housing is a ball bearing having an inner race secured to the periphery of said carrier adjoining said gear teeth and an outer race supported on said means connected to said housing.

6. An electrical hand tool as claimed in claim 1, wherein the intermediate wall portion of said carrier is fitted with ventilating fins.

7. An electrical hand tool as claimed in claim 1, including a handle affixed to the side of said housing opposite to said tool member.

8. An electrical hand tool as claimed in claim 1, including a handle affixed to the side of said housing opposite to said member, and an adjustable hand strap secured to said housing and overlying said handle.

9. An electrical hand tool as claimed in claim 1, including a resiliently mounted cover for said housing located on the side thereof opposite to said tool-holding shaft, an operating handle connected to said cover, and an electric microswitch in said housing for actuation by pressure upon said cover.

10. An electrical hand tool as claimed in claim 1, said housing substantially enveloping said motor and gear carrier and said tool-holding shaft protruding outwardly through an aperture of said housing.

References Cited

UNITED STATES PATENTS

| | | | |
|---|---|---|---|
| 990,506 | 4/1911 | Strange | 15—49R |
| 1,299,990 | 4/1919 | Miller | 15—49R |
| 3,444,576 | 5/1969 | Daane | 15—28 |
| 2,104,436 | 1/1938 | Pattison et al. | 51—170.2 |
| 1,624,758 | 4/1927 | Powell et al. | 15—28X |

JAMES L. JONES, JR., Primary Examiner